US010412600B2

(12) United States Patent
Gottlib (10) Patent No.: US 10,412,600 B2
(45) Date of Patent: Sep. 10, 2019

(54) LEVERAGING DIVERSE COMMUNICATION LINKS TO IMPROVE COMMUNICATION BETWEEN NETWORK SUBREGIONS

(71) Applicant: SILVER SPRING NETWORKS, INC., Redwood City, CA (US)

(72) Inventor: Elad Gottlib, San Ramon, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 950 days.

(21) Appl. No.: 14/271,278

(22) Filed: May 6, 2014

(65) Prior Publication Data

US 2014/0328272 A1 Nov. 6, 2014

Related U.S. Application Data

(60) Provisional application No. 61/819,752, filed on May 6, 2013.

(51) Int. Cl.
*H04W 24/02* (2009.01)
*H04W 40/24* (2009.01)

(52) U.S. Cl.
CPC ........... *H04W 24/02* (2013.01); *H04W 40/24* (2013.01)

(58) Field of Classification Search
CPC .... H04J 4/00; H04J 9/00; H04L 5/007; H04L 2027/0083; H04L 27/2657; H04L 1/0041; H04L 49/9057; H04Q 7/20; H04W 4/00; H04W 24/02; H04W 40/24
See application file for complete search history.

(56) References Cited

U.S. PATENT DOCUMENTS

| 6,263,468 B1 * | 7/2001 | Kondo | H04N 19/89 714/774 |
| 6,581,170 B1 * | 6/2003 | Kondo | H04N 19/89 714/701 |
| 2006/0120472 A1 * | 6/2006 | Joshi | H04L 27/152 375/260 |
| 2008/0220788 A1 * | 9/2008 | Stanwood | H04L 5/0007 455/450 |
| 2009/0181612 A1 * | 7/2009 | May | H04H 20/67 455/3.01 |
| 2010/0149961 A1 * | 6/2010 | Lee | H04L 5/0007 370/204 |
| 2013/0246726 A1 * | 9/2013 | Kirstenpfad | G06F 16/10 711/162 |

(Continued)

*Primary Examiner* — Raj Jain
(74) *Attorney, Agent, or Firm* — Artegis Law Group, LLP (57) ABSTRACT

A first subregion of a wireless mesh network is configured to transmit a data packet across multiple communication links to a second subregion of the wireless mesh network. Due to varying connectivity levels associated with the multiple communication links, the second subregion receives different versions of the data packet. A designated node within the second subregion receives the different versions and then combines those versions to reconstruct the data packet. The designated node may receive the multiple versions of the data packet from nodes within the first subregion and/or receive multiple versions of the data packet from nodes residing within the second subregion. In this fashion, the designated node leverages path diversity between the first and second subregions to remedy poor connectivity between those subregions.

21 Claims, 8 Drawing Sheets

(56) References Cited

U.S. PATENT DOCUMENTS

2013/0321588 A1* 12/2013 Abraham ............... H04N 13/20
          348/47
2014/0328272 A1* 11/2014 Gottlib ................. H04W 24/02
          370/329

* cited by examiner

LEVERAGING DIVERSE COMMUNICATION LINKS TO IMPROVE COMMUNICATION BETWEEN NETWORK SUBREGIONS

CROSS-REFERENCE TO RELATED APPLICATIONS

This application claims the benefit of U.S. provisional patent application titled "Utilizing The Mesh Network Where Neighbors Can Use and Share Data With Other Neighbors Within a Good Link Cluster To Overcome Link Challenges Due To Noise, Fading Or Propagation," filed on May 6, 2013 and having Ser. No. 61/819,752, which is hereby incorporated herein by reference.

BACKGROUND OF THE INVENTION

Field of the Invention

Embodiments of the present invention relate generally to wireless network communications and, more specifically, to leveraging diverse communication links to improve communication between network subregions.

Description of the Related Art

A conventional wireless mesh network includes a plurality of nodes configured to communicate with one another across communication links. The communication links between different nodes typically provide varying levels of connectivity between those nodes depending on, for example, geographical relationships between the nodes, interference levels associated with those nodes, or other environmental and/or operational factors than affect wireless transmissions. Accordingly, some nodes may have good connectivity with one another and, thus, be capable communicating with one another with low error rates, while other nodes may have poor connectivity with one another, and, therefore, only be capable of communicating with higher error rates.

One consequence associated with the varying levels of connectivity mentioned above is that the wireless mesh network can become segmented into "pockets" of nodes that have good internal connectivity, but are not well connected to other pockets of nodes. For example, a group of nodes that reside within close proximity to one another could maintain good communication links with one another that provide a high level of connectivity. However, those nodes could be unable to maintain good communication links with geographically distant nodes in other pockets. As a general matter, although communication between nodes within a given pocket may confer high bandwidth and low error rates communications between nodes within that pocket, poor connectivity between pockets may severely limit the overall capacity of the wireless mesh network in terms of bandwidth and error rate, among other things.

As the foregoing illustrates, what is needed in the art is an effective approach for communicating data between network subregions having poor connectivity with one another.

SUMMARY OF THE INVENTION

One embodiment of the present invention sets forth a computer-implemented method for transmitting data between different subregions of a network, including receiving a first version of data transmitted via a first communication link that couples a first network subregion to a second network subregion, receiving a second version of the data transmitted via a second communication link that also couples the first network subregion to the second network subregion, and reconstructing the data at a designated node within the second network subregion based on the first version of the data and the second version of the data.

One advantage of the techniques set forth herein is that the first and second subregions may be capable of maintaining effective communication with one another despite interference and other factors that limit connectivity between the two subregions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
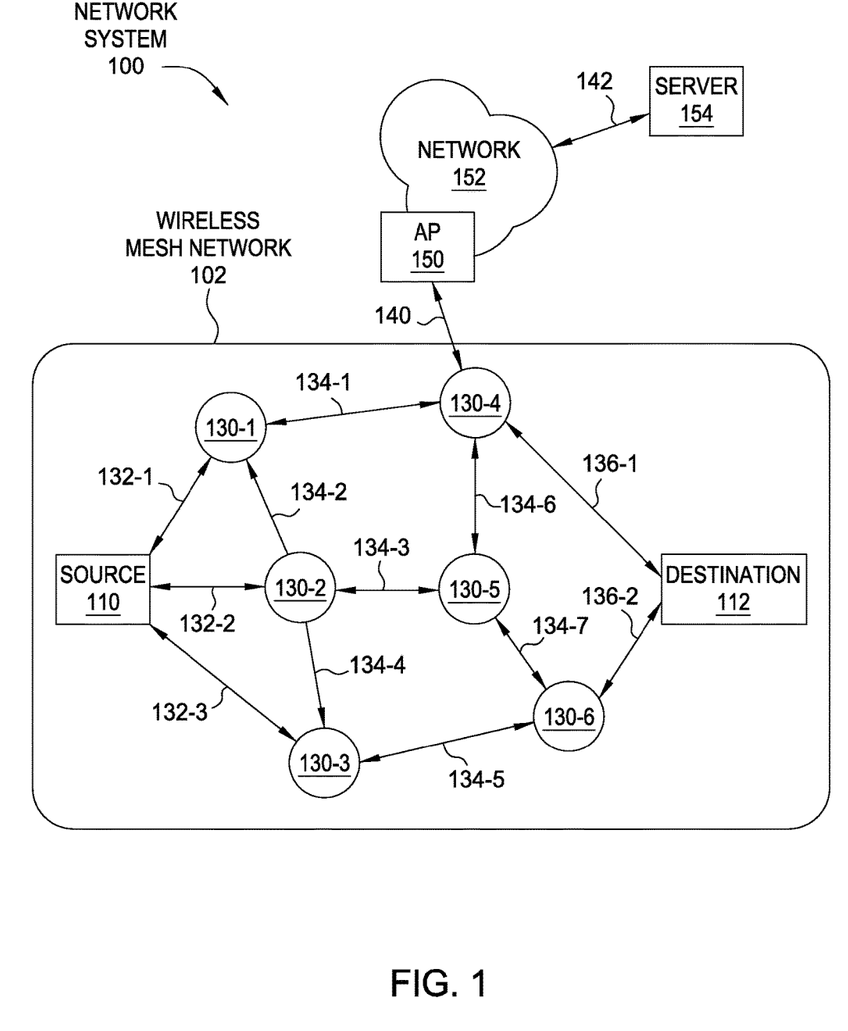
FIG. 1 illustrates a network system configured to implement one or more aspects of the invention.

FIG. 1 illustrates a network system 100 configured to implement one or more aspects of the invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
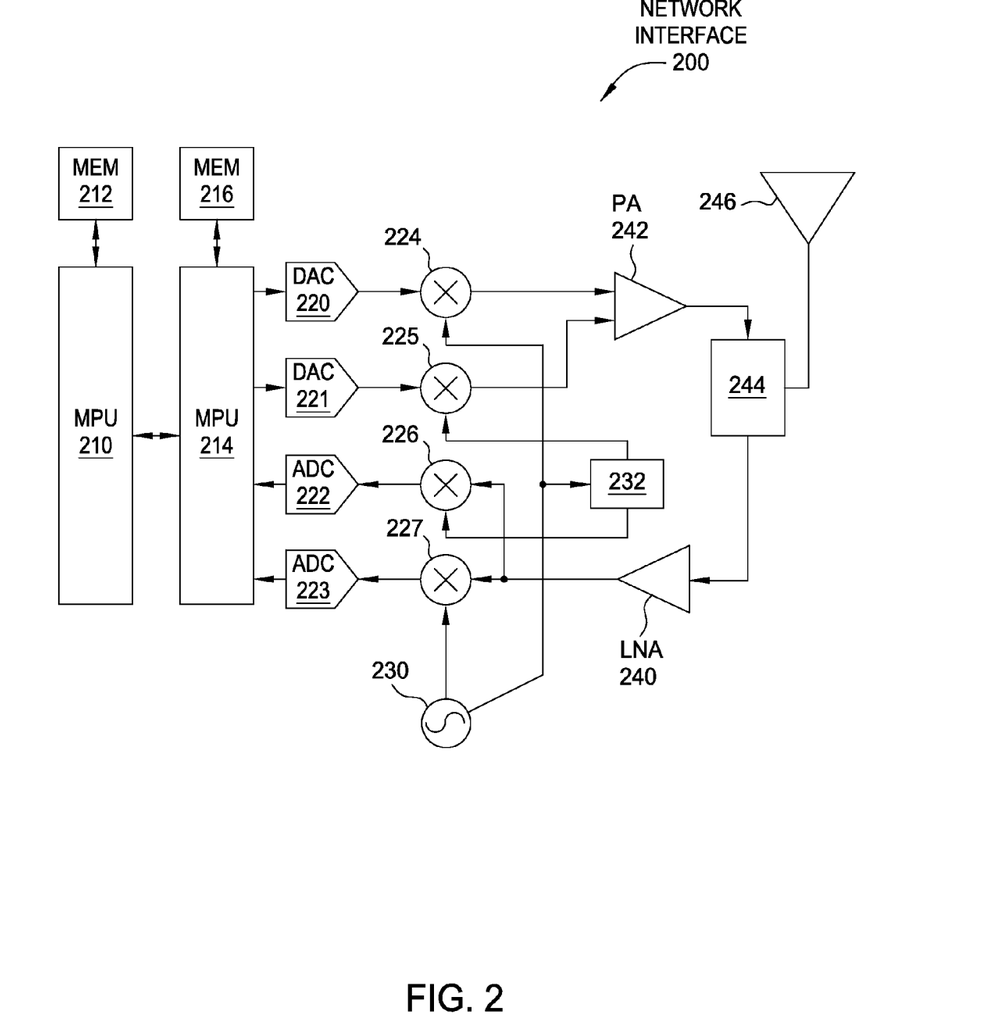
FIG. 2 illustrates a network interface configured to transmit and receive data within a mesh network, according to one embodiment of the invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3A-5, when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The MPU 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring back now to FIG. 1, each node 130 within wireless mesh network 102 may be associated with a different subregion of wireless mesh network 102, where each subregion includes nodes 130 coupled together by communication links 134 that provide good connectivity. In the context of this disclosure, a communication link that provides "good" connectivity generally meets a given connectivity metric. For example, a communication link with good connectivity could allow data to be communicated with at least a minimum signal-to-noise ratio (SNR), with below a maximum error rate, or with at least a threshold quality of service (QOS). Persons skilled in the art will recognize that other connectivity metrics may reflect a certain level of connectivity associated with a communication link.

Wireless mesh network 102 may include many network subregions that are interconnected with one another via multiple communication links 134. However, the different network subregions may be coupled to one another via communication links 134 having poor connectivity, i.e. communication links that fail to meet a given connectivity metric, such as those mentioned above. In such situations, wireless mesh network 102 may become segmented into subregions that cannot effectively communicate with one another, potentially limiting the throughput of the network as a whole.

To resolve this issue, nodes 130 within different network subregions may leverage path diversity between those subregions to improve connectivity. In doing so, one or more nodes 130 within a given network subregion transmit multiple versions of a data packet across multiple communication links 134 to one or more nodes 130 within another network subregion. The one or more nodes 130 within the other subregion receive data associated with those multiple versions, and then a designated node in that subregion reconstructs the data packet based on the multiple versions, as described in greater detail below in conjunction with FIGS. 3A-5.

Leveraging Diverse Communication Links

Figure 3A:
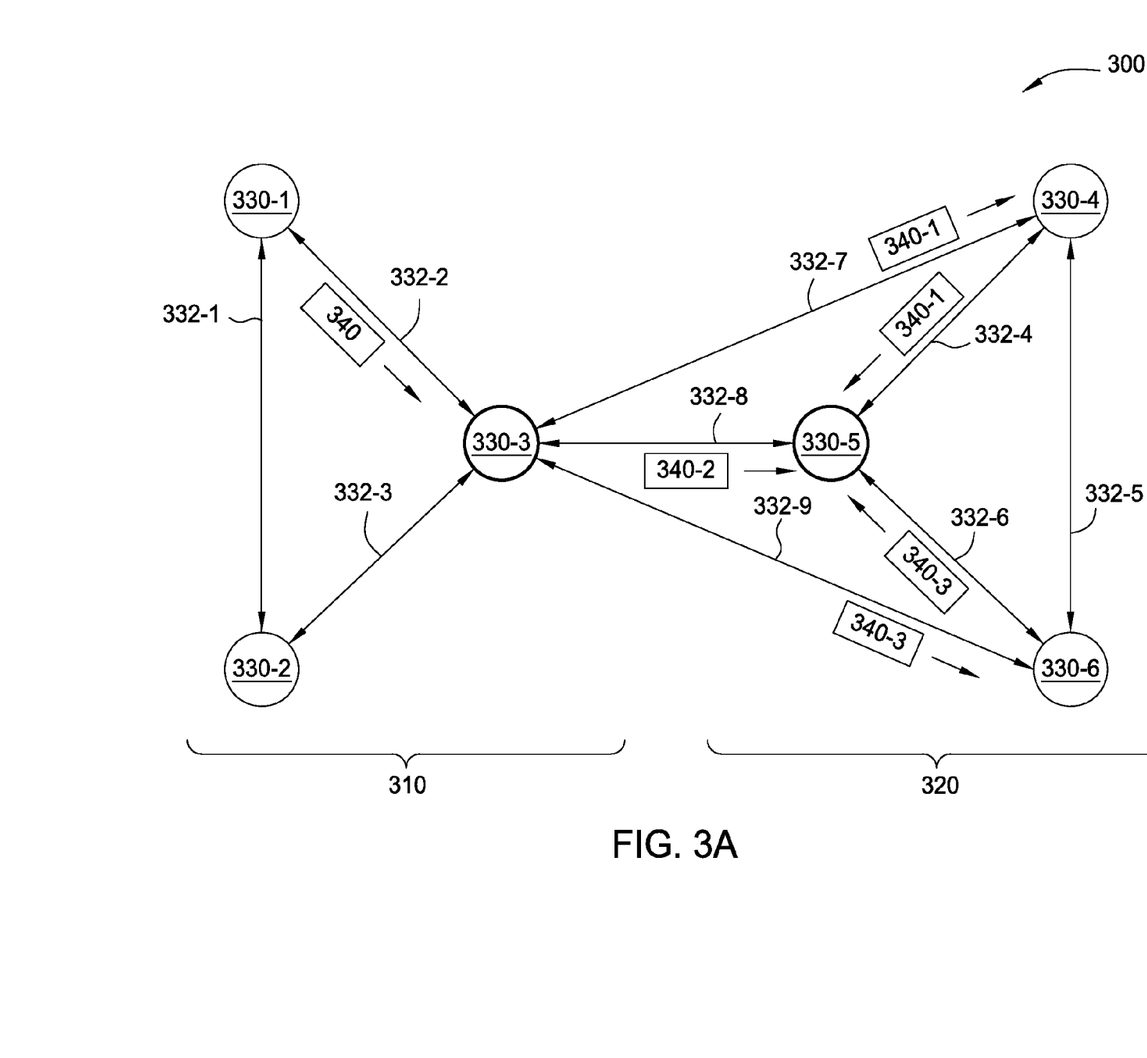
FIGS. 3A-3C illustrate a plurality of network subregions coupled together via multiple communication links that provide low connectivity, according to various embodiments of the present invention.

FIG. 3A illustrates a region 300 of wireless mesh network 102 of FIG. 1 that includes a plurality of network subregions coupled together via multiple communication links that provide low connectivity, according to one embodiment of the present invention. As shown, each of subregions 310 and 320 include a plurality of nodes 330 coupled together by communication links 332. Each node 330 may represent any of nodes 130, source 110, destination 112, and access point 150 shown in FIG. 1, while each communication link 332 may represent either of communication links 134 or 140, also shown in FIG. 1.

Subregion 310 includes nodes 330-1, 330-2, and 330-3. Node 330-1 is coupled to nodes 330-2 and 330-3 by communication links 332-1 and 332-2, respectively, and nodes 330-2 and 330-3 are coupled together by communication link 332-3. Similarly, subregion 320 includes nodes 330-4, 330-5, and 330-6. Node 330-4 is coupled to nodes 330-5 and 330-6 by communication links 332-4 and 332-5, respectively, and nodes 330-5 and 330-6 are coupled together by communication link 332-6. Subregions 310 and 320 are coupled together by communication links 332-7, 332-8, and 332-9. Specifically, node 330-3 of subregion 310 is coupled to nodes 330-4, 330-5, and 330-6 by communication links 332-7, 332-8, and 332-9, respectively.

Subregions 310 and 320 generally represent groups of nodes 330 that have good connectivity with one another (i.e. connectivity that meets a specific connectivity metric such as SNR, QOS, etc). In particular, in subregion 310, communication links 332-1, 332-2, and 332-3 provide good connectivity between nodes 330-1, 330-2, and 330-3. Likewise, in subregion 320, communication links 332-4, 332-5, and 332-6 provide good connectivity between nodes 330-4, 330-5, and 330-6. However, communication links 330-7, 330-8, and 330-9 between subregions 310 and 320 may not provide connectivity that is consummate with that between nodes 330 within each such subregion.

Such variations in connectivity may result from a variety of different factors. For example, nodes 330 within subregions 310 could reside in close proximity to one another, and would therefore be capable of maintaining good connectivity with one another. Similarly, nodes 330 within subregion 320 could also reside in close proximity to one another and, accordingly, be capable of maintaining good connectivity with one another. However, subregions 310 and 320 could reside sufficiently far apart that good connectivity between those subregions would be difficult to maintain. In another example, nodes 330 within subregion 310 could be subject to interference that isolates those nodes from subregion 320, yet allows those nodes to communicate effectively with one another. The interference could be radio frequency (RF) interference, a physical barrier (such as a wall between subregions 310 and 320), and so forth.

As a general matter, various factors may conspire to limit connectivity between subregions 310 and 320, and yet allow good connectivity between nodes 330 within each such subregion. To mitigate the connectivity issues described above, nodes 330 of subregion 310 are configured to coordinate the transmission of data to nodes 330 of subregion 320 according to various techniques, one of which is described herein in conjunction with FIG. 3A (the other techniques are described below in conjunction with FIGS. 3B-3C).

In FIG. 3A, node 330-3 receives data packet 340 from node 330-1 for transmission to nodes 330 within subregion 320. Node 330-3 may also generate packet 340. Node 330-3 then transmits data packet 340 across communication links 332-7, 332-8, and 332-9 to nodes 330-4, 330-5, and 330-6, respectively. However, due to varying levels of connectivity associated with communication links 332-7, 332-8 and 332-9, different versions 340-1, 340-2 and 340-3 of data packet 340 actually arrive at subregion 320. Varying connectivity can introduce errors or other types of data corruption into data packet 340 during transmission, resulting in the different versions of data packet 340. Nodes 330-4, 330-5, and 330-6 are configured to receive versions 340-1 through 340-2 and to then collocate those different versions to node 330-5. Node 330-5 is configured to then reconstruct data packet 340 based on versions 340-1, 340-2, and 340-3.

Node 330-5 can reconstruct data packet 340 through any technically feasible approach to error correction in order to reconcile differences between versions 340-1 through 340-3. For example, node 330-5 could determine that versions 340-1 through 340-3 include different error information, and then identify specific regions of those versions that potentially include errors (and other regions that may not include errors). Node 330-5 could then combine the error-free portions of those different versions to reconstruct data packet 340. This particular example is described in greater detail below in conjunction with FIG. 4A.

In another example, node 330-5 could analyze carrier waves (or other transmission media) associated with versions 340-1, 340-2, and 340-3 and determine that some of those carrier waves were impeded by interference during transmission. Node 330-5 could then identify, across all versions, the carrier waves that did, in fact, arrive at subregion 320 with limited interference, and then assemble those carrier waves to reconstruct data packet 340. This particular example is discussed in greater detail below in conjunction with FIG. 4B.

Each node 330 within subregion 320 may also characterize communication links 332 between subregions 310 and 320 and to then incorporate that characterization into the reconstruction process described thus far. For example, node 330-4 could determine that communication link 332-7 is subject to interference within a particular channel, and could then discard that channel upon receipt of version 340-1 (or portions thereof). Node 330-4 could also notify node 330-5 that version 340-1 should be processed to remove the interference associated with communication channel 332-7.

In one embodiment, nodes 330 are configured to buffer received versions of packet data for reconstruction purposes only when needed. With this approach, versions 340-1 through 340-3 need only be collocated to node 330—in situations where node 330-5 detects errors within version 340-2. When errors are detected, node 330-5 queries nodes 330-4 and 330-6, which then retrieves versions 340-1 and 340-3, respectively, from buffers within nodes 330-4 and 330-6 for transmission to node 330-5. With this approach, bandwidth consumption within subregion 320 may be reduced since data may be collocated to node 330-5 less often.

Figure 3B:
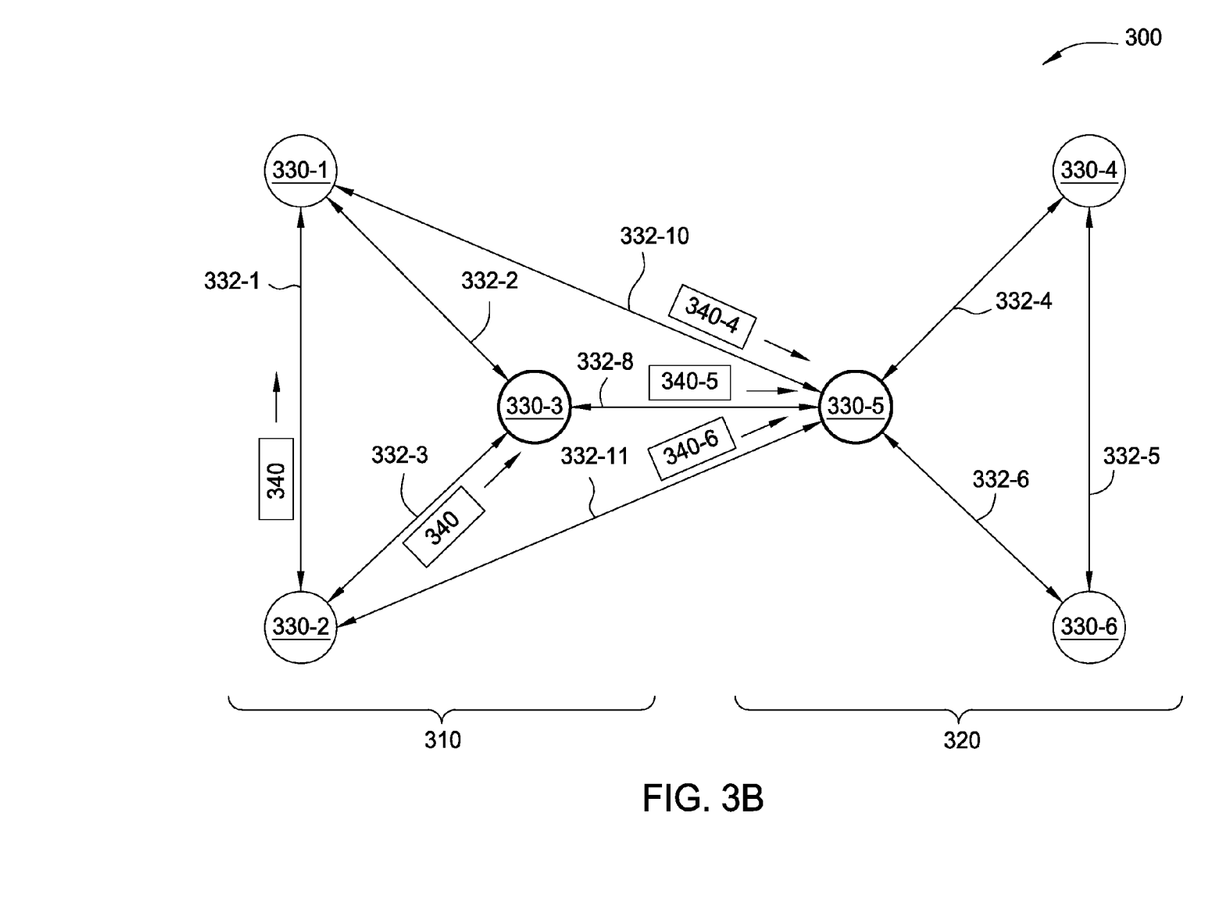
Figure 3C:
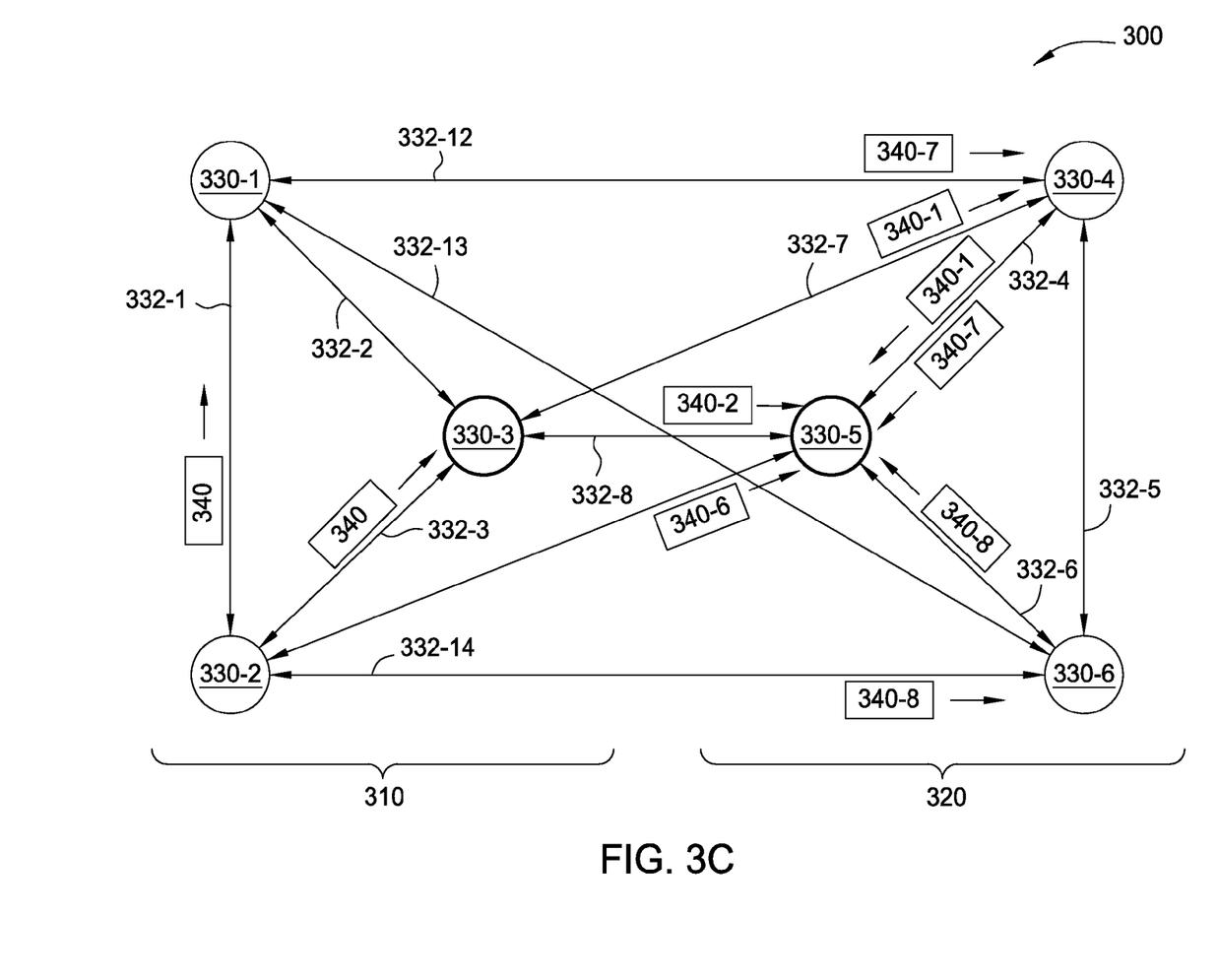

As a general matter, nodes 330 within subregion 320 may receive and share any type of data in order to reconstruct data packet 340, including versions 340-1 through 340-3 of data packet 340, error detection and/or correction data associated with those versions, soft bits or hard bits associated with each received version, channel characterization information, and so forth. Persons skilled in the art will recognize that the techniques described thus far may also be applied to network architectures other than the exemplary one shown in FIG. 3A. FIGS. 3B and 3C, described in greater detail below, illustrate other possible architectures where the techniques described above may be applied.

FIG. 3B illustrates a plurality of network subregions coupled together via multiple communication links that provide low connectivity, according to one embodiment of the present invention. As shown, nodes 330-1, 330-2 and 330-3 within subregion 310 are coupled to nodes 330-5 via communication links 332-10, 332-8, and 332-11. Although the network architecture shown in FIG. 3B differs from that shown in FIG. 3A, the path diversity between subregions 310 and 320 may still be leveraged to improve data transfer between those subregions.

Specifically, in the exemplary architecture shown in FIG. 3B, node 330-2 shares data packet 340 with nodes 330-1 and 330-3 prior to transmission of that data packet. Since nodes 330-1, 330-2 and 330-3 have good connectivity with one another, the likelihood that each of nodes 330-1 though 330-3 acquire the same version of data packet 340 is high. Nodes 330-1, 330-2, and 330-3 then transmit data packet 340 across communication links 332-10, 332-8, and 332-11, respectively. Since communication links 332-10, 332-8, and 332-11 potentially have different connectivity and transmission properties, different versions 340-4, 340-5, and 340-6 of data packet 340 may arrive at node 330-5. Node 330-5 then reconstructs data packet 340 based on the received versions.

Node 330-5 may reconstruct data packet 340 by implementing any of the techniques described above in conjunction with FIG. 3A.

Referring generally to FIGS. 3A-3B, those figures represent different extremes of multipath connections between subregions 310 and 320 of region 300: in FIG. 3A, all nodes 330 of subregion 320 are coupled to a single node 330-3 within subregion 310, while in FIG. 3B, all nodes 330 of subregion 310 are coupled to a single node 330-5 within subregion 320. In practice, the architecture of region 300 may resemble a combination of these two extremes, and may thus be more diverse than either of the architectures shown in FIGS. 3A-3B. The techniques described thus far are equally applicable to such diverse architectures, as described in greater detail below in conjunction the FIG. 3C.

FIG. 3C illustrates a plurality of network subregions coupled together via multiple communication links that provide poor connectivity, according to one embodiment of the present invention. As shown, subregions 310 and 320 are coupled together by communication links 332-7 and 332-8, as shown in FIG. 3A, and communication link 332-11, as shown in FIG. 3B. In addition, subregions 310 and 320 are also coupled together by communication links 332-12, 332-13, and 332-14. Specifically, node 330-1 within subregion 310 is coupled to nodes 330-4 and 330-6 within subregion 320 by communication links 332-12 and 332-13, respectively, and node 330-2 within subregion 310 is coupled to node 330-6 within subregion 320 by communication link 332-14.

In operation, node 330-2 is configured to share data packet 340 with nodes 330-1 and 330-2. Node 330-1 then transmits data packet 340 to node 330-4, which receives version 340-7 of data packet 340 across communication link 332-12. Node 330-4 then forwards version 330-7 to node 330-5. Node 330-3 also transmits data packet 340 to node 330-5, which receives version 340-2 of data packet 340 across communication link 332-8, and node 330-2 transmits data packet 340 to node 330-5, which receives version 340-6 of data packet 340 across communication link 332-11.

The different versions of data packet 340 may then be collocated to node 330-5 to allow that node to reconstruct data packet 340, in similar fashion as described above in conjunction with FIGS. 3A-3B. Node 330-5 may also acquire versions of data packet 340 received across other communication links, such as versions 340-7 and 340-8 received across communication links 332-12 and 332-14, respectively. Persons skilled in the art will recognize that the functionality described herein may be applicable to any technically feasible arrangement of communication links 332 that provide multiple pathways between subregions 310 and 320.

Referring generally to FIGS. 3A-3B, nodes 330 may self-organize into subregions 310 and 320 according to a wide variety of different possible techniques. For example, a group of nodes 330 could associate with one another to form a subregion upon determining that the communication links 332 between those nodes provide an acceptable level of connectivity. The nodes 330 within the newly-formed subregion could also identify other subregions with which the newly-formed subregion has unacceptable connectivity, and then implement the aforementioned techniques to communicate effectively with those other subregions. As a general matter, each node 330 within region 300 is configured to identify a particular subregion to which that node should belong, and to then coordinate with other nodes in the identified subregion in the fashion described thus far. In other embodiments, the techniques described herein may be practiced without explicit coordination between nodes, thereby relying on multiple paths between nodes without defined organization into subregions.

Figure 4A:
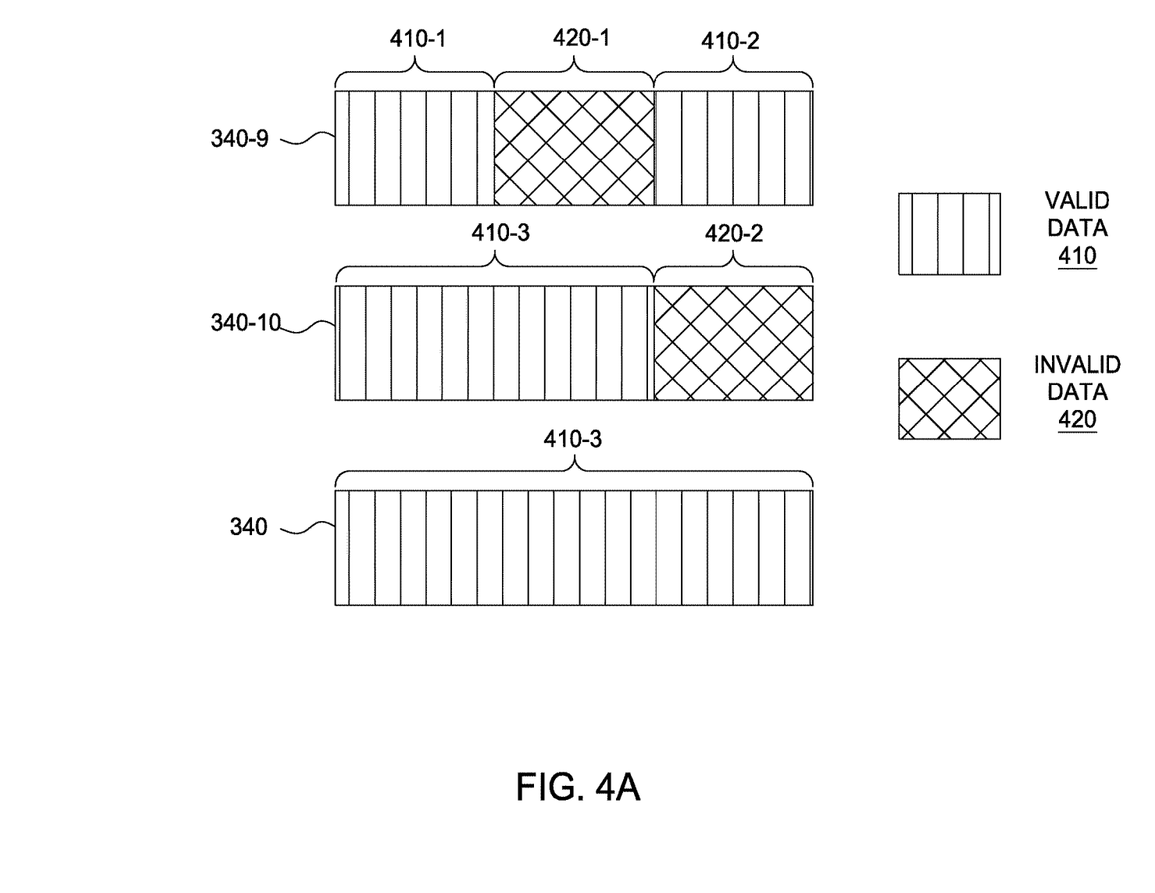
FIGS. 4A-4B illustrate exemplary techniques for reconstructing a data packet based on different versions of that data packet received across the multiple communication links of FIGS. 3A-3C, according to various embodiments of the present invention.
Figure 4B:
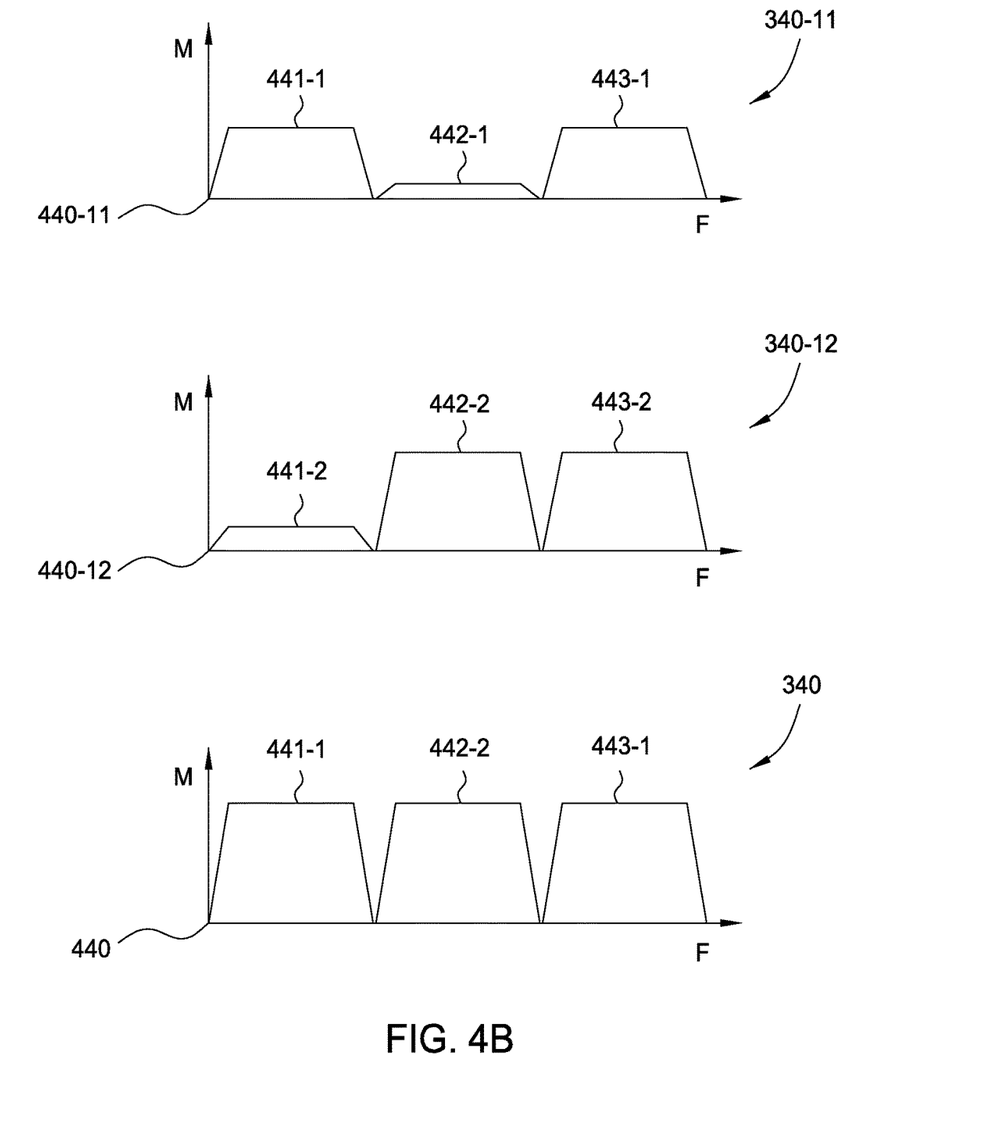

In FIGS. 3A-3C, when different versions of data packets arrive within subregion 320, node 330-5 reconstructs data packet 340 from those different versions, as described above. As also described, node 330-5 may implement a wide variety of possible techniques for reconstructing that data packet. FIGS. 4A-4B provide two different examples of reconstruction techniques that may be implemented by nodes 330. Persons skilled the art will understand that other techniques also fall within the scope of the present invention.

FIG. 4A illustrates one exemplary technique for reconstructing a data packet based on different versions of that packet received across the multiple communication links of FIGS. 3A-3C, according to one embodiment of the present invention.

As shown, a version 340-9 of a data packet 340 includes different portions of data, some of which constitute valid data 410 and others that constitute invalid data 420. In particular, version 340-9 includes valid data 410-1 and 410-2, and invalid data 420-1. As also shown, a version 340-10 of data packet 340 includes valid data 410-3 and invalid data 420-2. Versions 340-9 and 340-10 may include invalid data due to connectivity issues associated with a communication link across which those versions traveled. Such issues may include interference, among other sources of noise and/or errors.

A given node 330 to which versions 340-9 and 340-10 may be collocated is configured to combine those different versions to reconstruct data packet 340. In doing so, the node 330 parses valid data 410-1 and 410-2 from version 340-9 and valid data 410-3 from version 340-10, thereby acquiring all valid data needed for data packet 340. The node 330 may then combine that valid data to reconstruct data packet 340. Persons skilled in the art will recognize that the approach described herein is applicable to other forms of data beyond data packets, including soft bits, samples of data signals, and so forth. Persons skilled in the art will also understand that data within a version of data packet 340 may be identified as valid or invalid via a wide variety of different techniques, including CRC bits and other error detection and/or correction codes.

FIG. 4B illustrates an exemplary technique for reconstructing frequency data associated with a data packet based on different versions of that frequency data received across the multiple communication links of FIGS. 3A-3C, according to one embodiment of the present invention. As shown, frequency data 440 represents a set of carrier waves (or other transmission media) used to transmit data packet 340 or portions of data packet 340 from subregion 310 to subregion 320. Versions 440-11 and 440-12 reflect data that actually arrives at subregion 320, where that data may be corrupted due to, e.g., poor connectivity between subregions. Versions 440-11 and 440-12 of frequency data 440 correspond to versions 340-11 and 340-12 of data packet 340, respectively.

As shown, version 440-11 of frequency data 440 includes carrier waves 441-1, 442-1, and 443-1. Each such carrier wave resides within a different range of frequencies (i.e. a channel). Sub-carrier waves may also be configured to carry data, including packet data, e.g. in an orthogonal frequency-division multiplexing (ODFM) implementation. Nominally, each carrier wave may have sufficient amplitude to enable accurate decoding. However, due to interference or other connectivity issues, carrier wave 442-1 is diminished in amplitude, or interfered with, compared to carrier waves 441-1 and 443-1, and may thus introduce errors when version 340-11 of data packet 340 is decoded based on version 440-11 of frequency data 440. Similarly, version 440-12 of frequency data 440 includes carrier waves 441-2, 442-2, and 443-2. Due to interference or other connectivity issues, carrier wave 441-2 is diminished in amplitude, or interfered with, compared to carrier waves 442-2 and 443-2 and, likewise, may introduce errors when version 340-12 of data packet 340 is decoded based on version 440-12 of frequency data 440.

When versions 440-11 and 440-12 of frequency data 440 arrive at subregion 320, those versions are collocated to a node 330 configured to perform the reconstruction process described above in conjunction with FIGS. 3A-3C. The node 330 is configured to identify that carrier waves 441-1 and 443-1 of version 440-11 arrived with little to no interference, and similarly, determine that carrier waves 442-2 and 443-2 of version 440-12 also arrived intact. Then, the node 330 combines this valid carrier wave data to reconstruct frequency data 440, which includes carrier waves 441-1, 442-2, and 443-1. Data packet 340 may then be decoded based on the reconstructed frequency data. Persons skilled in the art will understand that other transmission media, beyond carrier waves, also falls within the scope of the present invention. The technique described in this example provides yet another approach to leveraging path diversity between subregions to improve communications. A more generic approach is described below, in stepwise fashion, in conjunction with FIG. 5.

Figure 5:
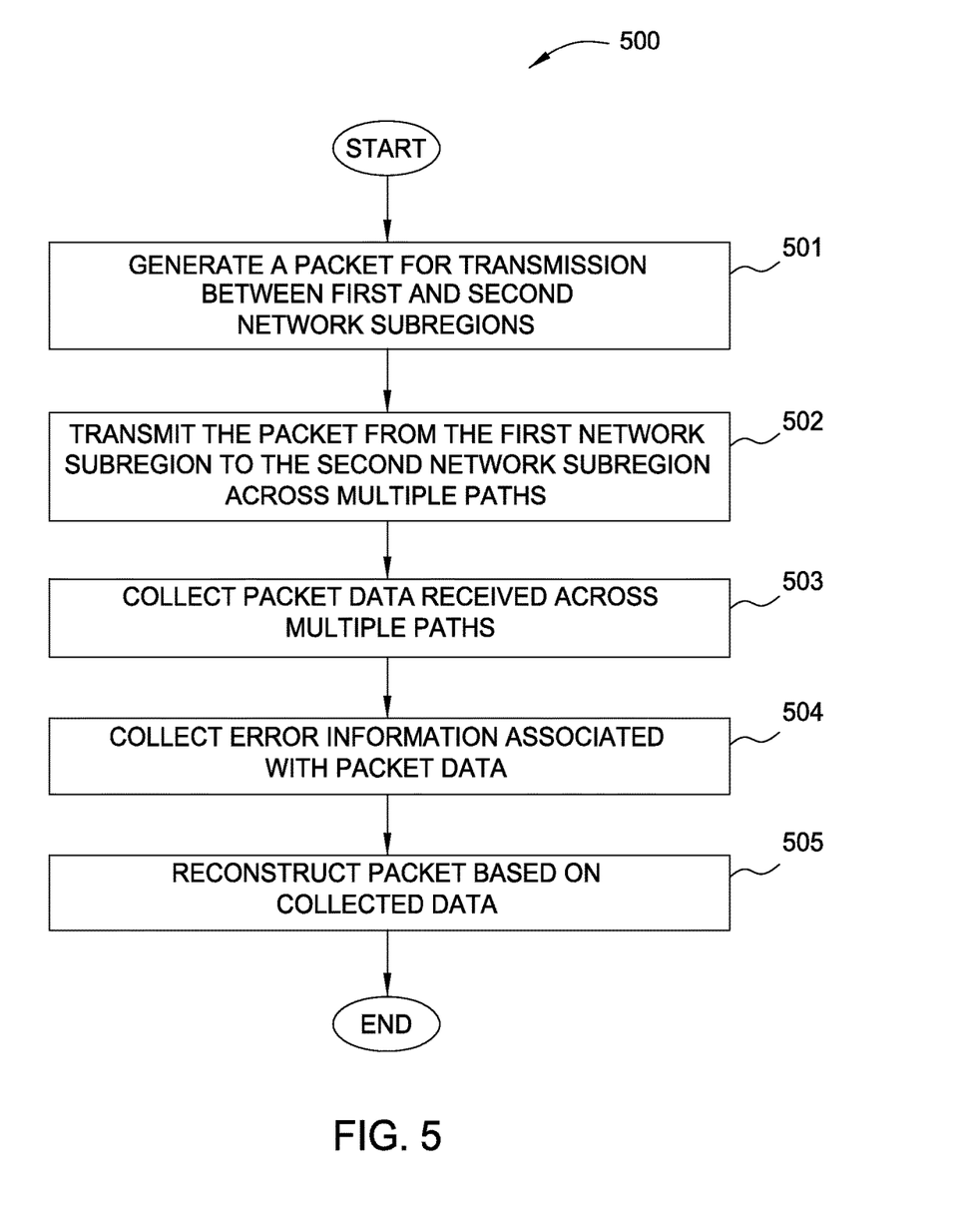
FIG. 5 is a flow diagram of method steps for reconstructing a data packet based on different versions of the data packet, according to one embodiment of the present invention.

FIG. 5 is a flow diagram of method steps for reconstructing a data packet based on multiple versions of that packet, according to one embodiment of the present invention. Although the method steps are described in conjunction with the systems of FIGS. 1-4B, persons skilled in the art will understand that any system configured to perform the method steps, in any order, is within the scope of the present invention.

As shown, a method 500 begins at step 501, where a node 330 within subregion 310 generates data packet 340 for transmission between subregion 310 and subregion 320. The node 330 may also share data packet 340 with other nodes 330 within subregion 310 for coordinated transmission to subregion 320. At step 502, the node 330, and potentially other nodes 330 with which data packet 340 has been shared, transmit data packet 340 from subregion 310 to subregion 320 across multiple communication links 332 between those subregions.

At step 503, a designated node 330 within subregion 320 collects packet data associated with the data packet 340 received across the multiple communication links 332. The designated node 330 may acquire the packet data from multiple communication links coupling that node to subregion 310, acquire the packet data from other nodes 330 within subregion 320, or a combination of the two. The collected packet data may include different versions of data packet 340 that arrive at subregion 320 (e.g., due to connectivity issues) as well as frequency data associated with those versions. As a general matter, at step 503, the designated node 330 may acquire a plurality of different types of packet data, as well as different versions of data packet 340, from nodes 330 within either or both of subregions 310 and 320.

At step 504, the node 330 collects error information associated with the received packet data, including the output of error detection/correction algorithms, CRC bits, channel characteristics determined by other nodes 330 within subregion 320, and so forth. At step 505, the node 330 within subregion 320 that collects the packet data and other information at steps 503 and 504 reconstructs data packet 340 based on that collected data. The node 330 within subregion 320 may implement any of the reconstruction techniques described above in conjunction with FIGS. 3A-4B when performing step 505.

Persons skilled in the art will understand that the method 500 may be implemented to coordinate the transfer of data within any and all of the network architectures discussed thus far. In particular, a designated node 330 within subregion 320 may, at step 503, collect versions of packet data that is initially received by other nodes within subregion 320 and then forwarded to the designated node 330, as described above in conjunction with FIG. 3A. In addition, the designated node 330 may also receive versions of packet data directly from one or more nodes within subregion 310, as described above in conjunction with FIG. 3B. Further, the designated node 330 may receive versions of packet data from multiple different nodes 330 residing in either of subregions 310 and 320, as described above in conjunction with FIG. 3C.

In sum, a first subregion of a wireless mesh network is configured to transmit a data packet to a second subregion of the wireless mesh network via multiple communication links. Due to varying connectivity levels associated with the multiple communication links, the second subregion may receive different versions of the data packet. A designated node within the second subregion collects the different versions of the data and then combines those different versions to reconstruct the data packet and, potentially, to reduce errors associated with those versions. In this fashion, path diversity between the first and second subregions can be leveraged to remedy poor connectivity between the subregions. Again, the techniques described herein may be practiced without explicit coordination between nodes, thereby relying on multiple paths between nodes without defined organization into subregions.

One advantage of the techniques set forth herein is that the first and second subregions may be capable of maintaining effective communication with one another despite interference and other factors that limit connectivity between the two subregions. Accordingly, by implementing the techniques described herein, the wireless mesh network as a whole may be capable of maintaining acceptable connectivity with low error rates and, thus, higher overall bandwidth.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A computer-implemented method for transmitting data between different subregions of a network, the method comprising:

receiving a first version of original data that is transmitted via a first communication link that couples a first network subregion to a second network subregion;

receiving a second version of the original data that is transmitted via a second communication link that also couples the first network subregion to the second network subregion; and reconstructing the original data at a designated node within the second network subregion based on error information associated with the first version of the original data and error information associated with the second version of the original data.

2. The computer-implemented method of claim 1, wherein the first network subregion includes two or more nodes coupled to one another through a first set of communication links that provide the two or more nodes with a level of connectivity that exceeds the level of connectivity provided by at least one of the first communication link and the second communication link.

3. The computer-implemented method of claim 1, wherein the second network subregion includes two or more nodes coupled to one another through a second set of communication links that provide the two or more nodes with a level of connectivity that exceeds the level of connectivity provided by at least one of the first communication link and the second communication link.

4. The computer-implemented method of claim 1,
wherein a first node that resides within the first network subregion transmits the first version of the original data to a second node that resides within the second network subregion via the first communication link,
wherein the second node, upon receiving the first version of the original data from the first node, forwards the first version of the original data to the designated node, and
wherein the first node also transmits the second version of the original data to the designated node via the second communication link.

5. The computer-implemented method of claim 1,
wherein a first node that resides within the first network subregion transmits the first version of the original data to the designated node via the first communication link,
wherein the first node also transmits the original data to a second node that also resides within the first network subregion, and
wherein the second node, upon receiving the original data transmitted by the first node, transmits the second version of the original data to the designated node via the second communication link.

6. The computer-implemented method of claim 1,
wherein a first node that resides within the first network subregion transmits the first version of the original data to the designated node via the first communication link,
wherein the first node also transmits the original data to a second node that also resides within the first network subregion,
wherein the second node, upon receiving the original data transmitted by the first node, transmits the second version of the original data to the designated node via the second communication link and transmits a third version of the original data to a third node that resides within the second network subregion via a third communication link,
wherein the third node, upon receiving the third version of the original data from the second node, forwards the third version of the original data to the designated node, and
wherein the designated node reconstructs the original data based on the first version of the original data, the second version of the original data, and the third version of the original data.

7. The computer-implemented method of claim 1, wherein reconstructing the original data comprises:
identifying valid data within the first version;
identifying valid data within the second version; and
combining the valid data within the first version with the valid data within the second version.

8. The computer-implemented method of claim 1, wherein receiving the first version of the original data comprises receiving a first set of carrier waves that encode the first version of the original data, wherein receiving the second version of the original data comprises receiving a second set of carrier waves that encode the second version of the original data, and further comprising:
identifying a first carrier wave within the first set of carrier waves that meets a transmission metric;
identifying a second carrier wave within the second set of carrier waves that also meets the transmission metric; and
combining the first carrier wave with the second carrier wave to reconstruct the original data at the designated node.

9. The computer-implemented method of claim 1, wherein the original data comprises one or more portions of a data packet or a set of carrier waves that encode the one or more portions of the data packet.

10. A non-transitory computer-readable medium storing program instructions that, when executed by a processing unit residing within a designated node within a second network subregion of a network, cause the processing unit to reconstruct data received from a first network subregion of the network, by performing the steps of:
receiving a first version of original data that is transmitted via a first communication link that couples the first network subregion to the second network subregion;
receiving a second version of the original data, that is transmitted via a second communication link that also couples the first network subregion to the second network subregion; and
reconstructing the original data based on error information associated with the first version of the original data and error information associated with the second version of the original data.

11. The non-transitory computer-readable medium of claim 10, wherein the first network subregion includes two or more nodes coupled to one another through a first set of communication links that provide the two or more nodes with a level of connectivity that exceeds the level of connectivity provided by at least one of the first communication link and the second communication link.

12. The non-transitory computer-readable medium of claim 11, wherein the second network subregion includes two or more nodes coupled to one another through a second set of communication links that provide the two or more nodes with a level of connectivity that exceeds the level of connectivity provided by at least one of the first communication link and the second communication link.

13. The non-transitory computer-readable medium of claim 10,
wherein receiving the first version of the original data comprises receiving the first version of the original data from a first node that resides within the second network subregion and is configured to receive the first version of the original data, via the first communication link, from a second node that resides within the first network subregion, and
wherein receiving the second version of the original data comprises receiving the second version of the original data, via the second communication link, from the second node.

14. The non-transitory computer-readable medium of claim 10,
wherein receiving the first version of the original data comprises receiving the first version of the original data, via the first communication link, from a first node that resides within the first network subregion, and
wherein receiving the second version of the original data comprises receiving the second version of the original data, via the second communication link, from a second node that resides within the first network subregion and is configured to receive the original data from the first node.

15. The non-transitory computer-readable medium of claim 10,
wherein receiving the first version of the original data comprises receiving the first version of the original data, via the first communication link, from a first node that resides within the first network subregion, and
wherein receiving the second version of the original data comprises receiving the second version of the original data, via the second communication link, from a second node that resides within the first network subregion and is configured to receive the original data from the first node, and further comprising the step of:
receiving a third version of the original data from a third node that resides within the second network subregion and is configured to receive the third version of the original data, via a third communication link, from the second node,
wherein reconstructing the original data comprises reconstructing the original data based on the first version of the original data, the second version of the original data, and the third version of the original data.

16. The non-transitory computer-readable medium of claim 10, wherein the step of reconstructing the original data comprises:
identifying valid data within the first version;
identifying valid data within the second version; and
combining the valid data within the first version with the valid data within the second version.

17. The non-transitory computer-readable medium of claim 10, wherein the step of receiving the first version of the original data comprises receiving a first set of carrier waves that encode the first version of the original data, wherein the step of receiving the second version of the original data comprises receiving a second set of carrier waves that encode the second version of the original data, and further comprising the steps of:
identifying a first carrier wave within the first set of carrier waves that meets a transmission metric;

identifying a second carrier wave within the second set of carrier waves that also meets the transmission metric; and combining the first carrier wave with the second carrier wave to reconstruct the original data at the designated node.

18. The non-transitory computer-readable medium of claim 10, wherein the original data comprises one or more portions of a data packet or a set of carrier waves that encode the one or more portions of the data packet.

19. The non-transitory computer-readable medium of claim 10, wherein the first version of the original data and the second version of the original data are both transmitted by the same node that forms the first network subregion.

20. A system configured to transmit data between a first network subregion and a second network subregion of a network that includes a plurality of nodes, comprising:
a designated node included within the second network subregion, comprising:
a memory unit, and
a processing unit configured to:
receive a first version of original data that is transmitted via a first communication link that couples the first network subregion to the second network subregion,
receive a second version of the original data, that is transmitted via a second communication link that also couples the first network subregion to the second network subregion, and
reconstruct the original data based on error information associated with the first version of the original data and error information associated with the second version of the original data.

21. The system of claim 20, further comprising:
a first node included in the first network subregion and configured to transmit the first version of the original data to the designated node via the first communication link;
a second node included in the second network subregion and configured to receive the second version of the original data via the second communication link and forward the second version of the original data to the designated node; and
a third node included in the first network subregion and configured to receive the original data from the first node and transmit a third version of the original data to the designated node via a third communication link.

* * * * *